US012141207B2

(12) United States Patent
Yamada et al.

(10) Patent No.: US 12,141,207 B2
(45) Date of Patent: Nov. 12, 2024

(54) MAJOR POINT EXTRACTION DEVICE, MAJOR POINT EXTRACTION METHOD, AND NON-TRANSITORY COMPUTER READABLE RECORDING MEDIUM

(71) Applicant: NIPPON TELEGRAPH AND TELEPHONE CORPORATION, Tokyo (JP)

(72) Inventors: Setsuo Yamada, Tokyo (JP); Yoshiaki Noda, Tokyo (JP); Takaaki Hasegawa, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 718 days.

(21) Appl. No.: 17/268,471

(22) PCT Filed: Aug. 14, 2019

(86) PCT No.: PCT/JP2019/031933
§ 371 (c)(1),
(2) Date: Feb. 14, 2021

(87) PCT Pub. No.: WO2020/036190
PCT Pub. Date: Feb. 20, 2020

(65) Prior Publication Data
US 2021/0182342 A1  Jun. 17, 2021

(30) Foreign Application Priority Data
Aug. 15, 2018  (JP) ................................. 2018-152891

(51) Int. Cl.
*G10L 15/22* (2006.01)
*G06F 16/9032* (2019.01)
(Continued)

(52) U.S. Cl.
CPC .... *G06F 16/90332* (2019.01); *G06F 16/9038* (2019.01); *G06F 16/904* (2019.01); *G10L 15/22* (2013.01)

(58) Field of Classification Search
CPC ..... G10L 15/22; G10L 15/1815; G10L 15/26; G10L 15/1822; G10L 25/48; G06F 16/3329
See application file for complete search history.

(56) References Cited

U.S. PATENT DOCUMENTS 6,941,266 B1 * 9/2005 Gorin .................. H04M 3/4936
704/E15.04
10,236,017 B1 * 3/2019 Witt-Ehsani ............ G06F 40/35
(Continued)

OTHER PUBLICATIONS

Nagao et al. (2004) "Language Information Processing," Published by Iwanami Shoten Co., Ltd., pp. 76-85.

*Primary Examiner* — Mark Villena

(57) ABSTRACT

The present invention allows appropriate acquisition of focus points in a dialogue. The focus point extraction device 1 comprises: a dialogue scene predict unit (13) for predicting the dialogue scene of an utterance included in dialogue; an utterance type prediction sort unit (16) for predicting whether utterances are to be subjected to utterance type prediction; an utterance type predict unit (20) for predicting the utterance type of the utterance having been predicted as one to be subjected to the utterance type prediction; an utterance content extraction necessity predict unit (21) for predicting, in a case in which it has been predicted that the utterance belongs to any utterance type, whether a portion of the utterance is to be subjected, as utterance focus point information, to extraction or classification; and an utterance content extract unit (23) for: extracting or classifying the portion of the utterance from the utterance as the utterance focus point information, in a case in which it is predicted that (Continued)

a portion of the utterance is to be subjected to extraction or classification; and extracting or classifying the entirety of the utterance as the utterance focus point information, in a case in which it is predicted that a portion of the utterance is not to be subjected to extraction or classification.

16 Claims, 7 Drawing Sheets

(51) Int. Cl.
    *G06F 16/9038*     (2019.01)
    *G06F 16/904*     (2019.01)

(56) References Cited

U.S. PATENT DOCUMENTS

| | | | |
|---|---|---|---|
| RE47,974 E * | 5/2020 | Gelfenbeyn | G10L 15/1815 |
| 2004/0162724 A1* | 8/2004 | Hill | G10L 15/1822 |
| | | | 704/231 |
| 2010/0049517 A1* | 2/2010 | Huang | G06F 40/35 |
| | | | 704/E15.005 |
| 2012/0084081 A1* | 4/2012 | Melamed | G06F 16/3344 |
| | | | 704/211 |
| 2016/0285807 A1* | 9/2016 | Bastide | G06Q 10/107 |
| 2017/0372694 A1* | 12/2017 | Ushio | G10L 21/0272 |
| 2018/0052664 A1* | 2/2018 | Zhang | G06N 5/04 |
| 2018/0090132 A1* | 3/2018 | Ikeno | G10L 15/1815 |
| 2019/0130904 A1* | 5/2019 | Homma | G10L 15/18 |
| 2019/0182382 A1* | 6/2019 | Mazza | G10L 15/26 |
| 2019/0236204 A1* | 8/2019 | Canim | G10L 15/1815 |
| 2019/0237068 A1* | 8/2019 | Canim | G10L 15/22 |
| 2020/0042642 A1* | 2/2020 | Bakis | G06F 40/35 |
| 2020/0043479 A1* | 2/2020 | Mont-Reynaud | G06F 3/167 |

* cited by examiner

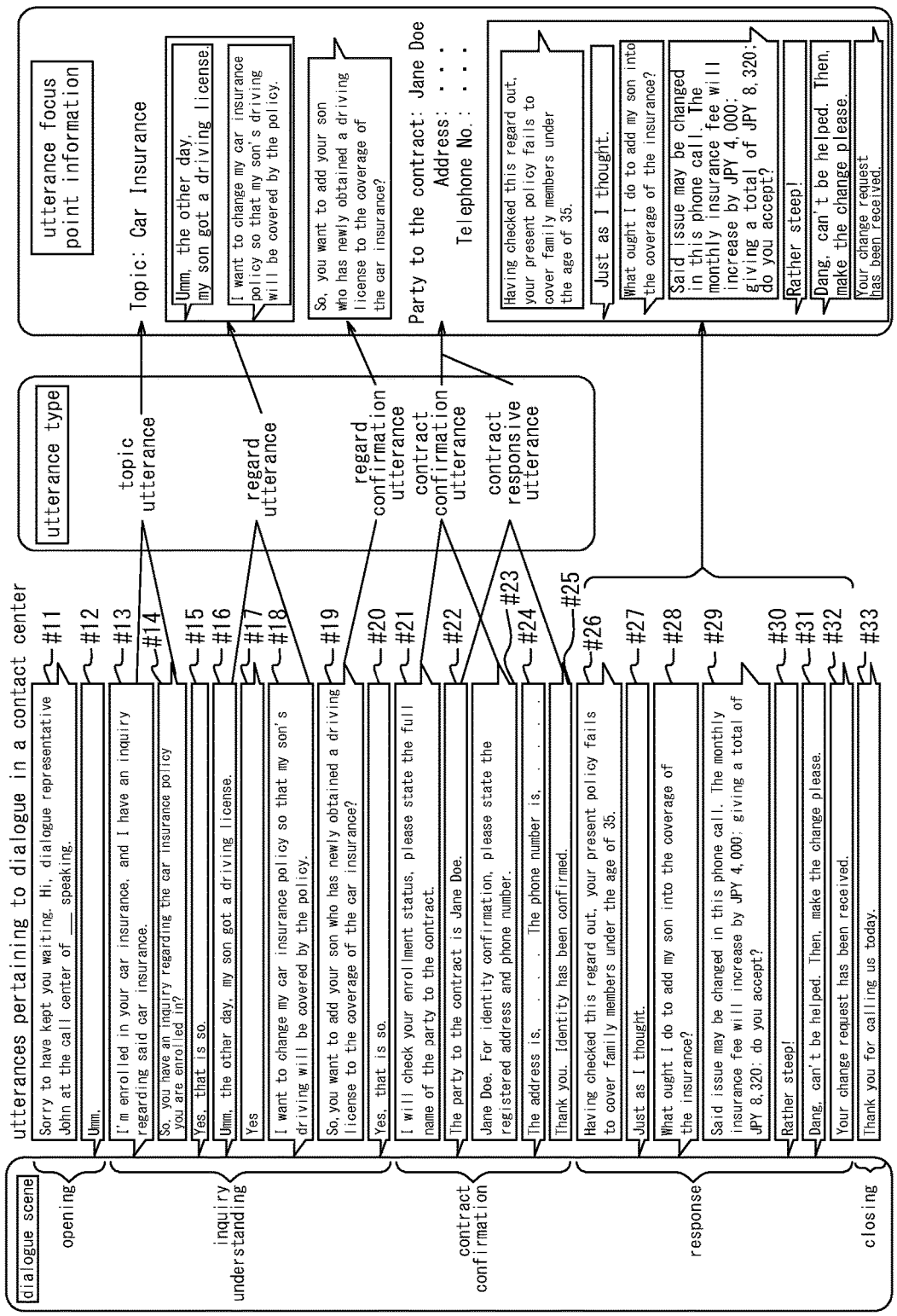

FIG. 3

| utterance type | dialogue scene targeted for prediction | dialogue scene not targeted for prediction |
|---|---|---|
| topic utterance | inquiry understanding | Response, contract confirmation, opening, closing |
| regard utterance | inquiry understanding | Response, contract confirmation, opening, closing |
| regard confirmation utterance | inquiry understanding | Response, contract confirmation, opening, closing |
| contract confirmation utterance | contract confirmation | Response, inquiry understanding, opening, closing |
| contract responsive utterance | contract confirmation | Response, inquiry understanding, opening, closing |

FIG. 4

| dialogue scene | utterance type of prediction target | utterance content extraction method |
|---|---|---|
| inquiry understanding | topic utterance | A portion of the utterance is deemed as utterance focus point information |
| | regard utterance | The entirety of the utterance is deemed as utterance focus point information |
| | regard confirmation utterance | The entirety of the utterance is deemed as utterance focus point information |
| contract confirmation | contract confirmation utterance | A portion of the utterance is deemed as utterance focus point information |
| | contract responsive utterance | A portion of the utterance is deemed as utterance focus point information |
| response | n/a | The entirety of the utterance is deemed as utterance focus point information |
| opening | n/a | Neither extraction nor classification of utterance focus point information is performed |
| closing | n/a | Neither extraction nor classification of utterance focus point information is performed |

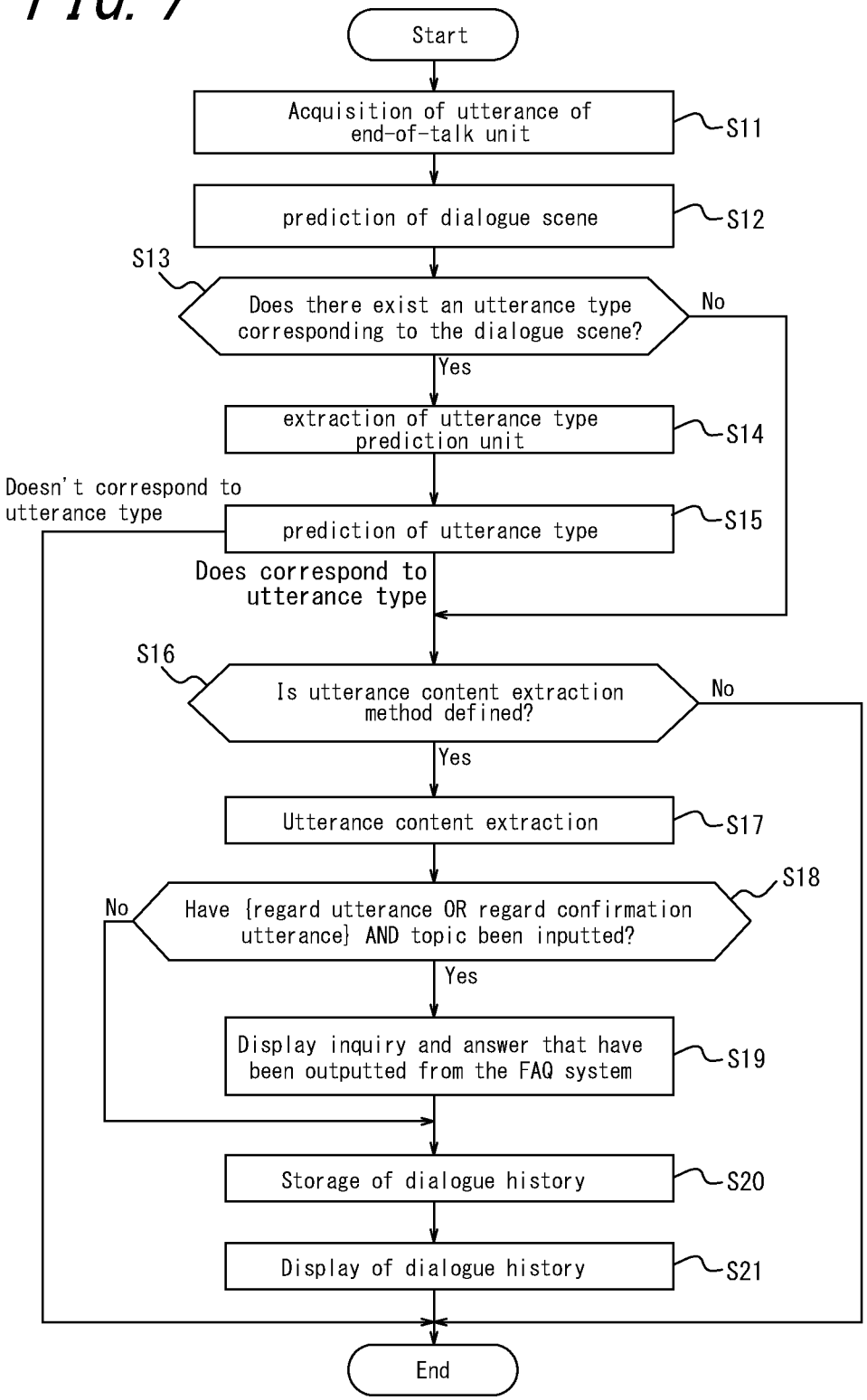

MAJOR POINT EXTRACTION DEVICE, MAJOR POINT EXTRACTION METHOD, AND NON-TRANSITORY COMPUTER READABLE RECORDING MEDIUM

CROSS-REFERENCE TO RELATED APPLICATIONS

This application is a U.S. 371 Application of International Patent Application No. PCT/JP2019/031933, filed on 14 Aug. 2019, which application claims priority to and the benefit of JP Application No. 2018-152891, filed on 15 Aug. 2018, the disclosures of which are hereby incorporated herein by reference in their entireties.

TECHNICAL FIELD

The present invention relates to a focus point extraction device, a focus point extraction method, and a program for extracting or classifying focus points in a dialogue between more than one speaker.

BACKGROUND

In call centers and the like, management of dialogue histories, that are based on dialogue between customers and service personnel, is desired. Reduction of the generation time for generating a dialogue history is needed. For example, it is known to extract words and utterances characterizing the content of a dialogue interaction, from all utterances in a dialogue between a customer and a service person in a call center, as focus points that are important information (see, NPL 1).

CITATION LIST

Non-Patent Literature

NPL 1: M. Nagao et al., "Linguistic Informatics", Iwanami Bookstore, Apr. 12, 2003, pp. 77-85.

SUMMARY

Technical Problem

However, according to dialogue interactions in a call center, because important information pertaining to various perspectives, which may include the focus points, is included, it is necessary to extract important information according to perspective. In a case in which it is desired to know what sort of dialogue interaction as a whole occurred, the scenario in which a speaker made an utterance (hereinafter, "the dialogue scene") may be important information. For example, in a case in which it is desired to know whether contract confirmation was performed, prediction becomes possible upon verification of whether contract confirmation was included in the dialogue scene extracted as important information, without looking at all utterances in the dialogue interaction. Further, in a case in which it is desired to know a specific utterance, the utterance of a different utterance content (hereinafter, "utterance type") may be important information. For example, in a case in which it is desired to know the regard about which a customer has inquired, without looking at all utterances of the dialogue interaction and by looking only at utterance types that are regard utterances that are extracted as important information, the regard content of the customer can be known. Further, in a case in which it is desired to know information obtained from a specific utterance, information obtained from utterances (hereinafter, "utterance focus point information") may be important information. For example, in a case in which it is desired to known the name of a party to a contract, without extracting names from all utterances of the dialogue interaction and by looking at only names extracted from a scope of dialogue scenes that are contract confirmation as important information, the name of the party to the contract can be known. In this case, because the name included in the utterances of the dialogue scene for confirming the contract is the name of the party to the contract, extraction as important information is appropriate, but names included in utterances of other dialogue scenes are not appropriate as important information. However, according to prior methods, because names included in various portions in the entirety of the utterances are extracted as important information, the extraction results may not be appropriate. That is to say, in some cases the important information extracted from utterances included in a dialogue may exhibit low accuracy. There is a need for high accuracy extraction of focus points in a dialogue from dialogue scene, utterance type, utterance focus point information, and the like, that are important information from various perspectives.

An objective of the present invention, made in view of abovementioned problems, is to provide a focus point extraction device, a focus point extraction method, and a program for appropriately acquiring the focus points in a dialogue.

Solution to Problem

In order to resolve abovementioned problem, the present invention provides a focus point extraction device for extracting or classifying focus points in a dialogue, the focus point extraction device comprising: a dialogue scene predict unit for predicting a dialogue scene of an utterance included in the dialogue; an utterance type prediction sort unit for predicting, based on the dialogue scene, whether the utterance is a target for utterance type prediction; an utterance type predict unit for predicting the utterance type of the utterance predicted to be the target for utterance type prediction by the utterance type prediction sort unit; an utterance content extraction necessity predict unit for predicting, based on the utterance type, in a case in which it has been predicted that the utterance belongs to any utterance type, whether a portion of the utterance for which the utterance type has been predicted is a target for extraction or classification as utterance focus point information; and an utterance content extract unit for: extracting or classifying the portion of the utterance from the utterance as the utterance focus point information based on the utterance type in a case in which it is predicted that a portion of the utterance for which the utterance type has been predicted is a target for extraction or classification as the utterance focus point information; and extracting or classifying the entirety of the utterance as the utterance focus point information in a case in which it is predicted that the portion of the utterance is not a target for extraction or classification as the utterance focus point information.

Further, in order to resolve abovementioned problem, the present invention provides a focus point extraction method regarding a focus point extraction device for extracting or classifying focus points in a dialogue, the method comprising: predicting a dialogue scene of an utterance included in the dialogue; predicting, based on the dialogue scene, whether the utterance is a target for utterance type prediction; predicting the utterance type of the utterance pertaining to the focus point predicted to be the target for extraction or classification; predicting, based on the utterance type, in a case in which it has been predicted that the utterance belongs to any utterance type, whether a portion of the utterance for which the utterance type has been predicted is a target for extraction or classification as utterance focus point information; and extracting or classifying the portion of the utterance from the utterance as the utterance focus point information based on the utterance type in a case in which it is predicted that a portion of the utterance for which the utterance type has been predicted is a target for extraction or classification as the utterance focus point information; and extracting or classifying the entirety of the utterance as the utterance focus point information in a case in which it is predicted that the portion of the utterance is not a target for extraction or classification as the utterance focus point information.

Further, to solve abovementioned problems, a program pertaining to the present invention causes a computer to function as the abovementioned focus point extraction device.

Advantageous Effect

According to the focus point extraction device, the focus point extraction method, and the program according to the present invention, the focus points in a dialogue can be appropriately acquired.

BRIEF DESCRIPTION OF THE DRAWINGS

In the accompanying drawings:

FIG. 2 is a diagram for explaining the relationship between utterances, dialogue scenes, utterance types, and utterance focus point information;

FIG. 3 is a diagram showing examples of sort definitions stored in a sort definition store shown in FIG. 1;

FIG. 4 is a diagram showing an example of an utterance focus point information extraction definition stored in an utterance focus point information extraction definition store shown in FIG. 1;

FIG. 5 is a diagram showing an example of extraction of an utterance in an utterance type prediction unit from utterances shown in FIG. 2;

FIG. 7 is a flowchart showing an example of a focus point extraction method to be executed by the focus point extraction device shown in FIG. 1.

DETAILED DESCRIPTION

Hereinafter, embodiments of the present invention will be described with reference to the drawings.

Figure 1:
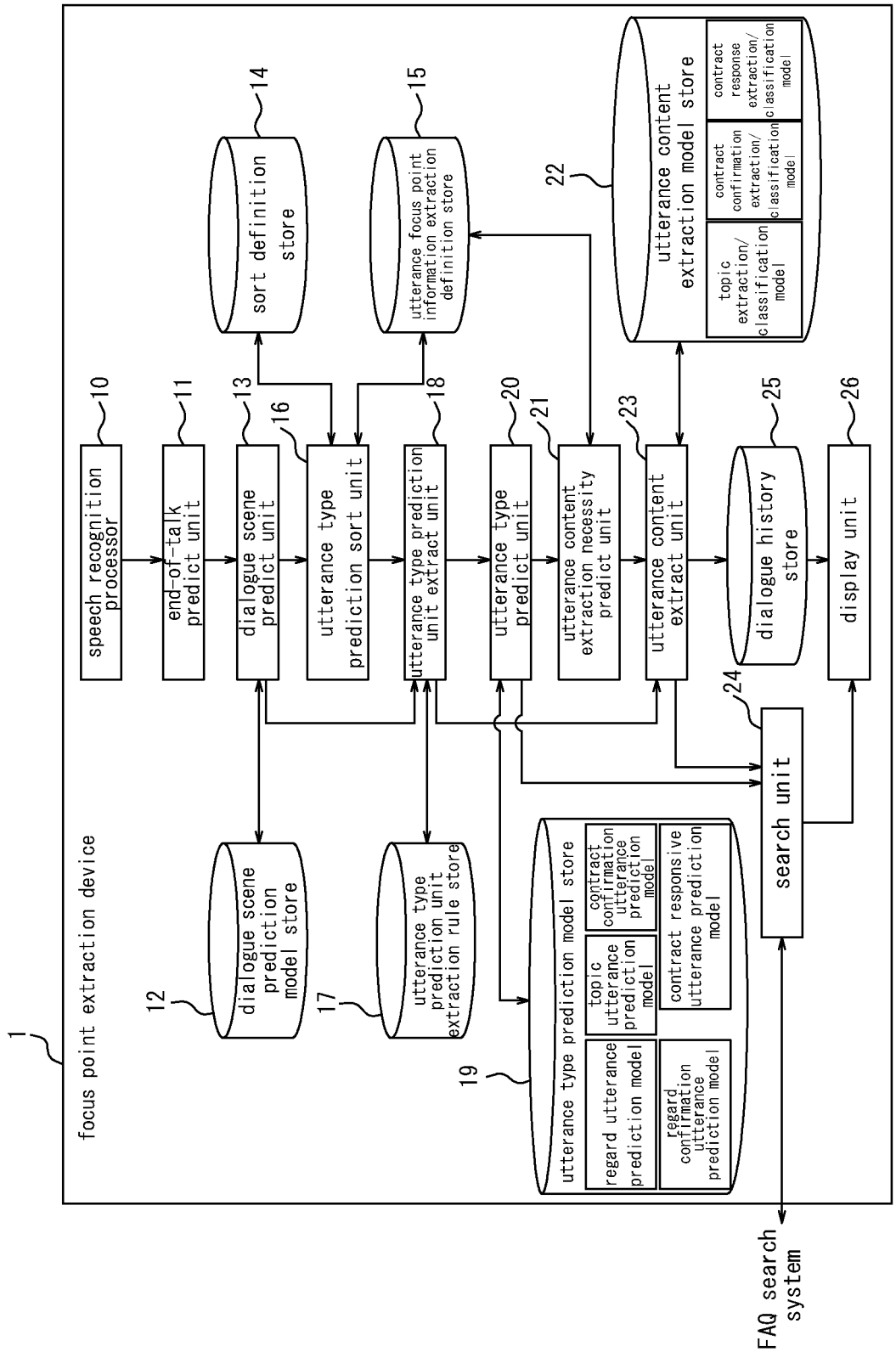
FIG. 1 is a functional block diagram showing an example configuration of a focus point extraction device according to an embodiment of the present invention.

FIG. 1 is a functional block diagram showing an example configuration of a focus point extraction device 1 according to an embodiment of the present invention. The focus point extraction device 1 according to the present embodiment extracts or classifies the focus points from a dialogue between a customer and a service person in a call center.

The focus point extraction device 1 of FIG. 1 comprises a speech recognition processor 10, an end-of-talk predict unit 11, a dialogue scene prediction model store 12, a dialogue scene predict unit 13, a sort definition store 14, an utterance focus point information extraction definition store 15, an utterance type prediction sort unit 16, an utterance type prediction unit extraction rule store 17, an utterance type prediction unit extract unit 18, an utterance type prediction model store 19, an utterance type predict unit 20, an utterance content extraction necessity predict unit 21, an utterance content extraction model store 22, an utterance content extract unit 23, a search unit 24, a dialogue history store 25, and a display unit 26.

The speech recognition processor 10 acquires utterances made by speech and converts the speech into text-transformed utterance information, by performing speech recognition. Specifically, the speech recognition processor 10 detects silent intervals spanning a prescribed time or longer in the speech and converts the speech between adjacent silent intervals into utterance information indicating utterances in a speech recognition unit.

As stated above, in speech recognition, when a silent interval persists for the prescribed time or longer, the utterances following the last utterance of the previous speech recognition processing unit and preceding that silent interval are subjected, as one processing unit, to speech recognition, and the speech recognition result for that processing unit is output. Further, in the speech recognition, when a silent interval persists for a prescribed time that is shorter than the silent interval set in order to predict the abovementioned processing unit, punctuation is placed in the speech recognition result at the position corresponding to that silent interval. Moreover, whether a period is to be placed or a comma is to be placed is, for example, decided appropriately on the basis of prior and subsequent context. For example, in Reference 1, an automated insertion method for insertion of punctuation into speech recognition results is described. Specifically, methods for inserting punctuation on the basis of words (surface form), parts of speech, segment boundaries, dependency information for immediately succeeding segments, and pauses and the like, are described. Further, after the cessation of speaking of a certain speaker, in a case in which a different speaker initiates speaking prior to passage of a silent interval by which placement of punctuation is predicted, punctuation may not be placed at the end of the speech recognition result of the utterances of the earlier speaker. Moreover, it is also possible to make it such that the placement of punctuation at the end of speech recognition results is compulsory.

Reference 1: Y. Akita and T. Kawahara, "Automatic Insertion Based on Multiple Annotation of Commas for Lectures", Journal of Information Processing Society of Japan, 1882-7765, No. 54, Vol. 2, 2013.

Here, the speech recognition processor 10 receives input of the utterances of the customer and the utterances of the service person made by speech in different channels (two channels), discriminates between the utterances of the customer and the utterances of the service person, and performs speech recognition.

As stated above, in many cases, the customer and the service person each make utterances in response to the utterances of the other, and this is repeated. Thus, the speech recognition processor 10 acquires from one dialogue, utterances of more than one end-of-talk unit. For example, in many cases of dialogues in call centers the customer and the service person alternately repeat utterances. FIG. 2 is a diagram for explaining the relationship between utterances, dialogue scenes, utterance types, and utterance focus point information. In the example shown in FIG. 2, the speech recognition processor 10 acquires utterances #11, 14, 17, 19, 21, 23, 25, 26, 29, 32, 33 as utterances of the service person. The speech recognition processor 10 acquires utterances #12, 13, 15, 16, 18, 20, 22, 24, 27, 28, 30, 31 as utterances of the customer.

The end-of-talk predict unit 11 predicts whether the respective utterances of the customer and the service person have reached end-of-talk; i.e. whether a cohesive utterance encompassing the things that the speaker wants to say has been made. Specifically, the end-of-talk predict unit 11 predicts, using the end-of-talk prediction model, whether utterances corresponding to a punctuation-partitioned string that is a string indicating text-converted utterances, and utterances corresponding to a string in which consecutive partitioned strings are connected in the order of the utterances, are end-of-talk utterances; such utterances included in the utterance information of the speech recognition unit converted by the speech recognition processor 10. Then, the end-of-talk predict unit 11 acquires utterances as a single end-of-talk unit that is demarcated by the speech initiation and end-of-talk of the speaker. For example, the utterance "Umm, the other day, my son got a driving license." (#16) is input to the end-of-talk predict unit 11. Here, the end-of-talk predict unit 11 predicts that the utterance up to this point does not constitute end-of-talk and, in continuance, the utterance "I want to modify my car insurance policy so that my son's driving will be covered by the policy." (#18) is inputted. The end-of-talk predict unit 11, upon predicting that the utterances up to this point constitute an end-of-talk unit, acquires the utterances "Umm, the other day, my son got a driving license. I want to change my car insurance policy so that my son's driving will be covered by the policy." (#16, 18) as utterances corresponding to an end-of-talk unit. The end-of-talk predict unit 11, upon acquiring the utterances corresponding to an end-of-talk unit, outputs the utterances of a single end-of-talk unit to the dialogue scene predict unit 13.

The dialogue scene prediction model store 12 stores dialogue scene prediction models that are generated by learning the correspondence between utterances and dialogue scenes. A dialogue scene is the scenario of the dialogue and, for example includes an "opening" scene pertaining to preliminary greetings, an "inquiry understanding" scene pertaining to inquiry content acquisition, a "contract confirmation" scene pertaining to confirmation that the customer is a party to the contract and confirmation of the contract details, a "response" scene pertaining to answers and responses provided to the customer in relation to the acquired inquiry content, and a "closing" scene pertaining to concluding salutations and the like. The learning may use, for example, a support vector machine (SVM).

The dialogue scene predict unit 13, upon acquisition of the utterances corresponding to an end-of-talk unit from the end-of-talk predict unit 11, predicts the dialogue scene corresponding to the utterances of the end-of-talk unit, using the dialogue scene prediction model. In the example shown in FIG. 2, the dialogue scene predict unit 13 predicts that the dialogue scene of the utterances "Sorry to have kept you waiting. This is dialogue representative speaking." is an "opening" scene. Further, the John at the call center for dialogue scene predict unit 13 predicts that the dialogue scene of the utterances "Umm, the other day, my son got a driving license. I want to change my car insurance policy so that my son's driving will be covered by the policy." (#16, 18) is an "inquiry understanding" scene. Further, the dialogue scene predict unit 13 predicts that the dialogue scene of the utterance "I will check the status of the contract, please state the full name of the party to the contract." (#21) is a "contract confirmation" scene.

FIG. 3 is a diagram showing the sort definitions stored in the sort definition store 14 shown in FIG. 1. The sort definition store 14, as shown in FIG. 3, stores sort definitions that interrelate utterance types, dialogue scenes subjected to prediction, and dialogue scenes not subjected to prediction. A dialogue scene subjected to prediction is a dialogue scene that is utilized in the learning data as a positive or negative sample. A dialogue scene not subjected to prediction is a dialogue scene that is utilized in the learning data as a negative example or one that is excluded from a learning scope. With respect to whether a dialogue scene should be used as a negative example or excluded from the learning scope, a predetermined setting may be set at the time of learning to adjust such that the example counts of positive and negative samples are equalized, for example.

According to the example shown in FIG. 3, "topic utterance" as an utterance type, "inquiry understanding" as a dialogue scene subject to prediction, and "response", "contract confirmation", "opening", and "closing" as dialogue scenes not subject to prediction, are correlated in a sort definition, for example. The sort definitions are, for example, generated based on the learning scope definitions used during learning. With respect to the sort definitions, from among the learning scope definitions, the dialogue scenes that include positive and negative samples in relation to learning data are considered to be dialogue scenes subject to prediction. With respect to the sort definitions, from among the learning scope definitions, dialogue scenes that solely include negative examples in the learning data are considered to be dialogue scenes not subject to prediction. For example, in a case in which prediction is to be made with respect to whether the utterance type is "topic utterance", utterances having a dialogue scene of "inquiry understanding" are subject to prediction as these contain positive and negative samples in the learning data; however, utterances having a dialogue scene of "contract confirmation", "response", "opening", or "closing" are not subject to prediction as these solely contain negative examples in the learning data.

FIG. 4 is a diagram showing an utterance focus point information extraction definition stored in the utterance focus point information extraction definition store 15 shown in FIG. 1. As shown in FIG. 4, the utterance focus point information extraction definition store 15 stores utterance focus point information extraction definitions that correlate dialogue scenes, prediction target utterance types, and utterance content extraction methods. An prediction target utterance type is an utterance type to be made the prediction target of the utterances of each dialogue scene. An utterance content extraction method is information that, with respect to the utterances of each dialogue scene, indicates whether to use a portion of the utterance as utterance focus point information, whether to use the entirety of the utterance as utterance focus point information, or to which of several pre-classified utterance focus point information showing the main content that the utterance should classified into. According to the examples of utterance focus point information extraction definitions shown in FIG. 4, "inquiry understanding" as the dialogue scene and "topic utterance", "regard utterance", and "regard confirmation utterance" as the prediction target utterance types, correspond. Further, "topic utterance" as the prediction target utterance type, and the utterance content extraction method of "setting a portion of the utterance as utterance focus point information" correspond. Further, "regard utterance" and "regard confirmation utterance" as the prediction target utterance types, and the utterance content extraction method of "setting the entirety of the utterance as utterance focus point information" correspond. Moreover, "extraction of utterance focus point information" refers to the extraction, from the utterances, of utterance focus point information that indicates the main content of the utterances. Here, "classification of utterance focus point information" refers to classifying utterances into any pre-classified utterance focus point information that indicates the main content of the utterances.

The utterance type prediction sort unit 16 predicts whether an utterance is a target for utterance type prediction, based on the dialogue scene predicted by the dialogue scene predict unit 13.

Specifically, the utterance type prediction sort unit 16 predicts, using the sort definitions, the existence of prediction target utterance types that correspond to the dialogue scene. In the example shown in FIG. 3, in a case in which the dialogue scene is "inquiry understanding", because the sort definition defines "inquiry understanding" as a dialogue scene subject to prediction, the utterance type prediction sort unit 16 predicts that utterances are to targeted for utterance type prediction. For example, the utterance type prediction sort unit 16 predicts that the utterances "Umm, the other day, my son got a driving license. I want to change my car insurance policy so that my son's driving will be covered by the policy" (#16 and #18) is a target for utterance type prediction because the dialogue scene of the utterances is "inquiry understanding". In a case in which the dialogue scene is "contract confirmation", because "contract confirmation" is defined as being a dialogue scene subject to prediction according to the sort definition, the utterance type prediction sort unit 16 predicts that it is a target for prediction of the prediction target utterance type. Further, in a case in which the dialogue scene is "opening" or "closing", because these dialogue scenes are included as dialogue scenes excluded from prediction and are not included as the dialogue scenes subject to prediction in the sort definition, the utterance type prediction sort unit 16 predicts that they are not targets for utterance type prediction.

Further, in a case in which the utterance type corresponding to the dialogue scene is not defined in the prediction target dialogue scenes of the sort definition, the utterance type prediction sort unit 16 predicts that the dialogue scene utterances are not targets for utterance type prediction. For example, in a case in which it has been predicted that the dialogue scene is "response", according to the example of FIG. 3, because "response" is not defined in the dialogue scenes subjected to prediction, it is predicted that utterances for which the dialogue scene is "response" are not targets for utterance type prediction.

The utterance type prediction unit extraction rule store 17 stores rules for extracting utterances as units for prediction of utterance type. For example, the utterance type prediction unit extraction rule store 17 may store an extraction rule for performing extraction up to a period or a final character in an utterance as a single unit.

The utterance type prediction unit extract unit 18 extracts the utterances of an utterance type prediction unit from utterances predicted by the utterance type prediction sort unit 16 as targets for utterance type prediction. Specifically, the utterance type prediction unit extract unit 18 extracts, based on rules stored by the utterance type prediction unit extraction rule store 17, the utterances in an utterance type prediction unit. For example, one rule would be to extract as one utterance type prediction unit, up to a period or the final character in a speech recognition result unit. The utterance type prediction unit extract unit 18 extracts, in accordance with this rule and based on a string text-converted by speech recognition of utterances in a dialogue, utterances in an utterance type prediction unit. Moreover, the utterance type prediction unit extract unit 18 may extract utterances of an utterance type prediction unit using a rule according to which the utterance type prediction units is a unit partitioned by punctuation other than periods (e.g. periods and/or commas).

In the example shown in FIG. 5, the utterance type prediction unit extract unit 18 extracts, for example, the utterances of the utterance type prediction unit "Umm, the other day, my son got a driving license." (#16); and the utterances of the utterance type prediction unit "I want to change my car insurance policy so that my son's driving will be covered by the policy" (#18) from the utterances "Umm, the other day, my son got a driving license. I want to change my car insurance policy so that my son's driving will be covered by the policy." (#16 and #18).

The utterance type prediction model store 19 stores utterance type prediction models generated by learning a correspondence between utterances and utterance types. For example, the utterance type prediction models may include regard utterance/regard confirmation utterance prediction models, topic utterance prediction models, and contract confirmation utterance/contract responsive utterance prediction models. The utterance type prediction model store 19 may store rules that indicate a predetermined correspondence between utterances and utterance types. A regard utterance prediction model is a model for predicting whether the utterance type of an utterance is "regard utterance". A regard confirmation utterance prediction model is a model for predicting whether the utterance type of an utterance is "regard confirmation utterance". A topic utterance prediction model is a model for predicting whether the utterance type of an utterance is "topic utterance". A contract confirmation utterance prediction model is a model for predicting whether the utterance type of an utterance is "contract confirmation utterance". A contract confirmation response prediction model is a model for predicting whether the utterance type of an utterance is "contract responsive utterance".

A "regard utterance" is an utterance that indicates the regard in a dialogue and is an utterance made by a customer in a dialogue between the customer and a service person. A "regard confirmation utterance" is an utterance that indicates confirmation of a regard in a dialogue and is an utterance made by a service person in a dialogue between a customer and the service person. A "topic utterance" is an utterance that indicates what the dialogue is about. A "contract confirmation utterance" is an utterance that confirms the contractual content in a dialogue. A "contract responsive utterance" is an utterance that indicates a response to a contract confirmation in a dialogue.

The utterance type predict unit 20, based on the dialogue scene predicted by the dialogue scene predict unit 13, predicts the utterance type of the utterances corresponding to an end-of-talk unit by predicting the utterance type of the utterances extracted by the utterance type prediction unit extract unit 18. Specifically, in a case in which it is predicted that at least one utterance corresponding to an prediction unit within the scope of an end-of-talk unit is the utterance type, the utterance type predict unit 20 predicts that the utterances of the end-of-talk unit are of that utterance type. The utterance type predict unit 20 uses each of the models included in the utterance type prediction model for each dialogue scene to predict the utterance type. The utterance type predict unit 20 may use the rules stored in the utterance type prediction model store 19, to predict the utterance type.

For example, as shown in FIG. 2, in a case in which the dialogue scene of the utterance is "inquiry understanding", the utterance type predict unit 20, based on the utterance focus point information extraction definitions shown in FIG. 4, uses each of the topic utterance prediction model, the regard utterance prediction model, and the regard confirmation prediction model, to predict the utterance types of the utterances extracted in an utterance type prediction unit. Specifically, the utterance type predict unit 20 uses the topic utterance prediction model to predict whether the utterance type of an utterance extracted in an utterance type prediction unit is "topic utterance". Further, the utterance type predict unit 20 uses the regard utterance prediction model to predict whether the utterance type of an utterance extracted in an utterance type prediction unit is "regard utterance". Further, the utterance type predict unit 20 uses the regard confirmation utterance prediction model to predict whether the utterance type of an utterance extracted in an utterance type prediction unit is "regard confirmation utterance".

For example, the utterance type predict unit 20 predicts whether each of the utterances of the utterance type prediction unit "Umm, the other day, my son got a driving license." (#16) is a "topic utterance", a "regard utterance", or a "regard confirmation utterance". In the example given in FIG. 2, the utterance type predict unit 20 predicts that the utterances of the utterance type prediction unit "Umm, the other day, my son got a driving license." (#16) are not any of a "topic utterance", a "regard utterance", and a "regard confirmation utterance". Further, the utterance type predict unit 20 predicts whether each of the utterances of the utterance type prediction unit "I want to change my car insurance policy so that my son's driving will be covered by the policy" (#18) is a "topic utterance", a "regard utterance", or a "regard confirmation utterance". In the example shown in FIG. 2, the utterance type predict unit 20 predicts that the utterances of the utterance type prediction unit "I want to change my car insurance policy so that my son's driving will be covered by the policy" (#18) are neither a "topic utterance" nor a "regard confirmation utterance" but is a "regard utterance". For the scope of utterances corresponding to the end-of-talk unit that includes #16 and #18, because it is predicted that #18 is a regard utterance, the utterance type predict unit 20 predicts that the utterance type of the utterances of the end-of-talk unit "Umm, the other day, my son got a driving license. I want to change my car insurance policy so that my son's driving will be covered by the policy" (#16 and #18) is "regard utterance".

For example, as shown in FIG. 2, in a case in which the dialogue scene of the utterance is "contract confirmation", the utterance type predict unit 20, based on utterance focus point information extraction definitions shown in FIG. 4, uses the contract confirmation utterance prediction model and the contract response utterance prediction model to predict the utterance type of the utterances extracted in the utterance type prediction unit. Specifically, the utterance type predict unit 20 uses the contract confirmation utterance prediction model to predict whether the utterance type of the utterances extracted in the utterance type prediction unit is "contract confirmation utterance". Further, the utterance type predict unit 20 uses the contract responsive utterance prediction model to predict whether the utterance type of the utterances extracted in the utterance type prediction unit is "contract responsive utterance".

For example, as shown in FIG. 2, in a case in which the dialogue scene of the utterances is "response", the utterance type predict unit 20 does not predict the utterance type of the utterances.

In a case in which, according to the prediction of the utterance type predict unit, the utterances corresponds to an utterance type, the utterance content extraction necessity predict unit 21 predicts, in accordance with the utterance focus point information extraction definition shown in FIG. 4, whether a utterance content extraction method is defined. Then, in a case in which an utterance content extraction method is defined, the utterance content extract unit 23 extracts the utterance focus point information from the utterance.

To explain in specific terms, the utterance content extraction necessity predict unit 21, as shown in FIG. 4, uses the focus point information extraction definition shown in FIG. 4 to predict whether an utterance, that has been predicted to be of any of the utterance types, is a target for "a portion of the utterance being set as utterance focus point information" or a target for "the entirety of the utterance being set as focus point information".

In the example shown in FIG. 4, in a case in which it is predicted by the utterance type predict unit 20 that the utterance type of an utterance is "topic utterance", the utterance content extraction necessity predict unit 21 predicts that the utterances of the end-of-talk unit are a target for "a portion of the utterance being set as utterance focus point information". In a case in which it is predicted by the utterance type predict unit 20 that the utterance type of an utterance of an end-of-talk unit is "regard utterance", the utterance content extraction necessity predict unit 21 predicts that the utterances of the end-of-talk unit are targets for "the entirety of the utterance being set as utterance focus point information". For example, the utterance content extraction necessity predict unit 21 predicts that the utterances "Umm, the other day, my son got a driving license. I want to change my car insurance policy so that my son's driving will be covered by the policy" (#16 and #18) are targets for "the entirety of the utterance being set as utterance focus point information".

The utterance content extraction model store 22 stores utterance content extraction models generated by learning a correspondence between utterances and utterance focus point information. For example, a topic utterance content extraction model and a contract confirmation/contract responsive utterance content extraction model are included in the utterance content extraction models. The topic utterance content extraction model is a model that indicates the correspondence between utterances having the utterance type of "topic utterance" and utterance focus point information. A topic indicating the central content in a dialogue is included, for example, in the utterance focus point information of a topic utterance. The contract confirmation utterance content extraction model is a model that indicates the correspondence between utterances having the utterance type "contract confirmation utterance" and utterance focus point information. The contract responsive utterance content extraction model is a model that indicates the correspondence between utterances having the utterance type "contract responsive utterance" and utterance focus point information. The name of a party to a contract, the address, and the telephone number are, for example, included in the utterance focus point information of contract confirmation utterances and contract responsive utterances. The utterance content extraction model store 22 may store predetermined rules indicating the correspondence between utterances and utterance focus point information.

The utterance content extract unit 23 uses an utterance content extraction model matching the utterance type of the utterance, to extract or classify a portion of the utterance as utterance focus point information, from an utterance predicted by the utterance content extraction necessity predict unit 21 to be a target for extraction or classification of a portion of the utterance. The utterance content extract unit 23 may, using the rules stored in the utterance content extraction model store 22, extract or classify utterance focus point information. Further, the utterance content extract unit 23 extracts or classifies, as utterance focus point information, the entirety of the utterances of an end-of-talk unit that the utterance content extraction necessity predict unit 21 has predicted is not a target for extraction or classification of a portion of the utterances.

For example, in a case in which it is predicted that the utterance type of the utterance is "topic utterance", the utterance content extract unit 23 uses the topic utterance content extraction model to extract or classify a portion of the utterance from the utterance as utterance focus point information. For example, a listing of topics is stored beforehand and in a case in which a topic utterance matches a topic stored in the listing of topics, the matched topic is extracted as the topic of that topic utterance. In the example shown in FIG. 2, the utterance content extract unit 23 extracts or classifies the topic "car insurance" as the utterance focus point information from the utterance "I'm enrolled in your car insurance, and I have an inquiry regarding said car insurance." (#13), predicted as being a "topic utterance".

For example, in a case in which it is predicted that the utterance type of the utterance is "regard utterance", the utterance content extract unit 23 extracts or classifies the entirety of the utterance as utterance focus point information. In the example shown in FIG. 2, the entirety of the utterance "Umm, the other day, my son got a driving license. I want to change my car insurance policy so that my son's driving will be covered by the policy" (#16 and #18) is extracted or classified as utterance focus point information.

For example, in a case in which the utterance type of the utterance is predicted to be "contract confirmation utterance" or "contract responsive utterance", the utterance content extract unit 23 respectively uses the contract confirmation content utterance extraction model and the contract responsive utterance content extraction model to extract or classify, from the utterance, a portion of the utterance as utterance focus point information. For example, the utterance content extract unit 23 extracts or classifies, from the utterance predicted to be a "contract confirmation utterance" or a "contract responsive utterance", the name of party to the contract, address, and telephone number as utterance focus point information.

The search unit 24 predicts whether to perform a FAQ search for each utterance in an end-of-talk unit. For example, in a case in which an utterance of an end-of-talk unit is predicted to be a regard utterance or a regard confirmation utterance, the search unit 24 performs a FAQ search. Further, the search unit 24 extracts search keywords from utterances of predetermined utterance types. Search keywords may, for example, be nouns included in the utterances. For example, the search unit 24 extracts search keywords from utterances that have been predicted to be regard utterances or regard confirmation utterances.

The search unit 24 inputs the utterances predicted by the utterance type predict unit 20 to be regard utterances or regard confirmation utterances, and topics extracted or classified by the utterance content extract unit 23 into the FAQ (Frequently Asked Questions) search system. In the example shown in FIG. 2, the search unit 24 inputs the regard utterances of the end-of-talk unit "Umm, the other day, my son got a driving license. I want to change my car insurance policy so that my son's driving will be covered by the policy." (#16 and #18) and the topic "car insurance" extracted or classified from the topic utterance, into the FAQ search system. As a result, even if the regard utterance and regard confirmation utterance do not include words that indicate the nature of the insurance involved, because the topic "car insurance" extracted or classified from the topic utterance is included, the FAQ search system may be appropriately searched to locate the FAQ needed by the service person.

Moreover, the search keywords that the search unit 24 inputs to the FAQ system need not be limited to a "topic". The search unit 24 may input, information (dialogue scene, utterance type, utterance focus point information), extracted as focus points, as search keywords. For example, in a case in which a geographical region is registered in the FAQ system (applicable rules and the like may differ according to region), the search unit 24 may input the "address" that was extracted or classified as utterance focus point information, to the FAQ system as a search keyword.

Inquiries that have been received from customers or are anticipated to be received from customers, and answers to such inquiries, are stored in the FAQ search system. Further, when an utterance and a topic are inputted, the search unit 24 receives inquiries and answers related to the utterance and the topic, that are searched by the FAQ search system.

The dialogue history store 25 stores a dialogue history including a dialogue scene predicted by the dialogue scene predict unit 13, an utterance type predicted by the utterance type predict unit 20, and focus points (utterance focus point information etc.) and the utterances of customers and service person.

The display unit 26 displays, on a display, inquiries and answers that have been searched by the FAQ search system and received at the search unit 24. Further, the display unit 26 displays, on the display, dialogue history stored in the dialogue history store 25.

Figure 6:
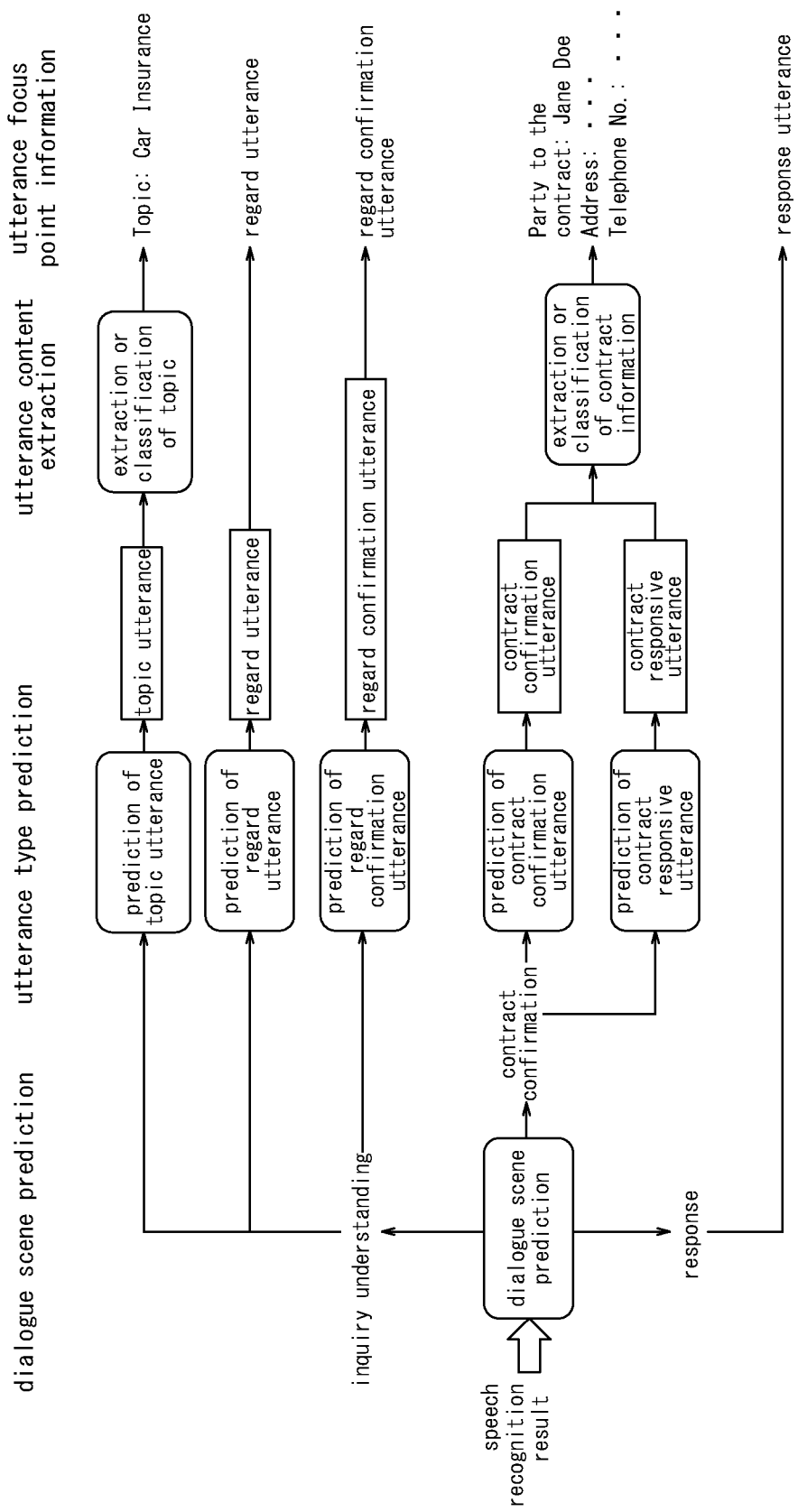
FIG. 6 is a diagram showing an outline of dialogue scene prediction, utterance type prediction, and extraction or classification of utterance focus point information.

Summing up the above, as shown in FIG. 6, when it is predicted that the dialogue scenes is "inquiry understanding", "contract confirmation", or "response", for an utterance of an end-of-talk unit acquired as a speech recognition result from a plurality of utterances in a dialogue, then utterance focus point information is extracted or classified. Further, for an utterance for which the dialogue scene is predicted to be "inquiry understanding", it is predicted whether the utterance type is "topic utterance", "regard utterance" and/or "regard confirmation utterance". For an utterance for which it has been predicted that the utterance type is "topic utterance", the topic is extracted or classified as utterance focus point information from the utterance. Then, the extracted or classified topic is stored in the dialogue history. For an utterance for which it has been predicted that the utterance type is "regard utterance" or "regard confirmation utterance", utterance focus point information is neither extracted nor classified, and the entirety of the utterance is extracted or classified as utterance focus point information and stored in the dialogue history.

Further, for an utterances for which the dialogue scene is predicted to be "contract confirmation", it is predicted whether the utterance type is "contract confirmation utterance" or "contract responsive utterance". Further, the name of a party to a contract, address, and telephone number are extracted or classified as utterance focus point information from utterances for which the utterance type is predicted as "contract confirmation utterance" or "contract responsive utterance". Then, the name of the party to the contract, address, and telephone number extracted or classified as utterance focus point information is stored in the dialogue history.

Further, for an utterance for which the dialogue scene is predicted to be "response", prediction of utterance type together with extraction or classification of utterance focus point information are not performed and the entirety of the utterance is extracted as utterance focus point information and stored in the dialogue history.

Further, for an utterance for which the dialogue scene is predicted to be "opening" or "closing", prediction of utterance type together with extraction or classification of utterance focus point information are not performed, extraction or classification of utterance focus point information is not performed, and storing to the dialogue history is not performed. Moreover, for an utterance for which the dialogue scene is predicted to be "opening" or "closing", utterance type prediction together with utterance focus point information extraction or classification are not performed and the entirety of the utterance may be extracted or classified as utterance focus point information and stored in the dialogue history.

Next, with reference to the flow chart shown in FIG. 7, the focus point extraction method performed by the focus point extraction unit 1 according to an embodiment will be explained. FIG. 7 is a flowchart showing one example of the focus point extraction method.

The utterances of an end-of-talk unit are acquired from the utterances of a speech recognition unit by the end-of-talk predict unit 11 (Step S11).

The dialogue scene of the utterances acquired by the end-of-talk predict unit 11 is predicted by the dialogue scene predict unit 13 using the dialogue scene prediction model (Step S12).

The utterance type prediction sort unit 16, using the sort definitions, predicts whether an prediction target utterance type corresponding to the dialogue scene exists (Step S13). For example, in a case in which it is predicted in Step S12 that the dialogue scene is "inquiry understanding", because the sort definition shown in FIG. 3 prescribes a correspondence between "inquiry understanding" and "topic utterance", "regard utterance", and "regard confirmation utterance", it is predicted that an prediction target utterance type corresponding to the dialogue scene exists. Further, in a case in which it is predicted in Step S12 that the dialogue scene is "opening", because "opening" is not defined in the sort definition shown in FIG. 3, it is predicted that an prediction target utterance type corresponding to the dialogue scene does not exist. Further, the utterance type prediction sort unit 16 may use a sort-prediction model that has been pre-learned to perform the prediction based on the sort definitions. Moreover, the utterance type prediction sort unit 16 may, using the utterance focus point information extraction definition shown in FIG. 4, predict whether an prediction target utterance type corresponding to the dialogue scene exists.

In a case in which it is predicted that the utterance is a target for utterance type prediction, utterances of an utterance type prediction unit are extracted by the utterance type prediction unit extract unit 18 using rules stored in the utterance type prediction unit extraction rule store 17 (Step S14).

The utterance type of the utterances extracted in Step S14 are predicted by the utterance type predict unit 20 (Step S15).

In a case in which the utterance does not correspond utterance type in the prediction of Step S15, processing ends. In a case in which the utterance corresponds to an utterance type in the prediction of Step S15, it is predicted whether a utterance content extraction method is defined in correspondence with the dialogue scene or the utterance type by the utterance content extraction necessity predict unit 21 using the utterance focus point information extraction definition (Step S16).

The utterance focus point information is extracted or classified from the utterances by way of the utterance content extract unit 23 (Step S17).

The search unit 24 predicts whether utterances for which the utterance type was predicted to be a regard utterance or a regard confirmation utterance in Step S15 and were extracted or classified as utterance focus point information in Step S17, and whether the topic which is the utterance focus point information extracted or classified in Step S18, were inputted to the FAQ search system (Step S18).

A search is performed by the FAQ search system, and inquiries and answers received by the search unit 24 are displayed on the display by the display unit 26 (Step S19).

The dialogue history including utterance focus point information extracted or classified in Step S17 is stored by the dialogue history store 25 (Step S20).

The dialogue history is displayed on the display by the display unit 26 (Step S21).

As has been explained, according to the present embodiment, the focus point extraction device 1 predicts, based on the dialogue scene, whether the utterance is a target for utterance type prediction. Further, in a case in which it is predicted that the utterance is a target for utterance type prediction, the focus point extraction device 1 predicts, based on the dialogue scene, the utterance type. Further, the focus point extraction device 1 predicts, based on the utterance type, whether a portion of the utterance for which the utterance type has been predicted is a target for extraction or classification as utterance focus point information; and extracts or classifies, from the utterance predicted to be a target, a portion of the utterance as utterance focus point information. Thus, because utterance focus point information anticipated to be included in a dialogue scene is extracted or classified from the dialogue scene, the focus point extraction device 1 may, compared to extraction or classification of utterance focus point information from the entirety of the dialogue, more appropriately extract or classify utterance focus point information.

Further, in the present embodiment, the focus point extraction device 1 extracts text-converted utterances in period delimited units, and predicts the utterance types of the extracted utterances. In general, period delimits unitary semantic chunks in single segments. Thus, the focus point extraction device 1 may extract or classify focus points from the unitary semantic chunks. Thus, the focus point extraction device 1 can extract or classify focus points of each utterance type of the utterances and appropriately acquire the focus points, by prediction of utterance type for each extracted utterance that is a chunk.

Further, in the present embodiment, the focus point extraction device 1 stores information regarding dialogue scene, utterance type, focus points that include utterance focus point information and the like, and dialogue history that includes the utterances of customers and service personnel. Thus, service personnel can, without performing work to create a dialogue history, promptly proceed to acquire the focus points after performance of a customer dialogue interaction.

Further, in the present embodiment, the dialogue history may further include the entirety of utterances in which a portion of the utterances was predicted not to be a target for extraction or classification as focus points. Thus, for example, in a case in which the service person wants to know the content of utterances other than the focus points, the content of those utterances may be gained by reference the dialogue history.

Though not discussed in the embodiments, a program for executing each process performed by a computer functioning as the focus point extraction device 1 may also be provided. Further, the program may be recorded on a computer readable medium. By using the computer readable medium installation on a computer is possible. Here, a computer readable medium having on which the program is recorded may be a non-transitory recording medium. Though the non-transitory recording medium is not particularly limited, it may be a recording medium such as a CD-ROM or a DVD-ROM etc.

Further, in the present embodiment, the focus point extraction device 1 need not include the utterance type prediction unit extraction rule store 17 and the utterance type prediction unit extraction device 18. In this case, the utterance type predict unit 20 predicts the utterance type of utterances of an end-of-talk unit that are utterances of the utterance type prediction unit that were not extracted.

Further, in the present embodiment, the focus point extraction device 1 need not include the speech recognition processor 10. In this case, the end-of-talk predict unit 11 may acquire utterances of a speech recognition unit from a speech recognition processing device that is not shown in the drawings and is different from the focus point extraction device 1, or may input textual dialogue from a chat or the like as respective utterances.

Further, in the present embodiment, the focus point extraction device 1 need not include the end-of-talk predict unit 11. In this case, the dialogue scene predict unit 13 may predict the dialogue scene of the utterances of a speech recognition unit that is speech recognized by the speech recognition processor 10 or a speech recognizing device that is not shown in the drawings.

Further, in the focus point extraction method of the present embodiment, though the focus point extraction device 1 is shown as executing Steps S18 and S19 and then executing Steps S20 and S21, this is not limiting. For example, the focus point extraction device 1 may execute Steps S20 and S21 and then execute Steps S18 and S19. Further, the focus point extraction device 1 may execute Steps S18 and S19 and Steps S20 and S21 simultaneously.

Further, in the focus point extraction method of the present embodiment, the focus point extraction device 1 may, after having executed up to Step S20, not execute Step S21. Further, the focus point extraction device 1 may, without having executed Steps S18 and S19, execute Steps S20 and S21.

Although the above embodiments have been described as typical examples, it will be evident to skilled person that many modifications and substitutions are possible within the spirit and scope of the present invention. Therefore, the present invention should not be construed as being limited by the above embodiments, and various changes and modifications can be made without departing from the claims. For example, it is possible to combine a plurality of constituent blocks described in the configuration diagram of the embodiment into one, or to divide one constituent block.

REFERENCE SIGNS LIST

1 focus point extraction device
10 speech recognition processor
11 end-of-talk predict unit
12 dialogue scene prediction model store
13 dialogue scene predict unit
14 sort definition store
15 utterance focus point information extraction definition store
16 utterance type prediction sort unit
17 utterance type prediction unit extraction rule store
18 utterance type prediction unit extract unit
19 utterance type prediction model store
20 utterance type predict unit
21 utterance content extraction necessity predict unit
22 utterance content extraction model store
23 utterance content extract unit
24 search unit
25 dialogue history store
26 display unit

The invention claimed is:

1. A focus point extraction device comprising a computer configured to:
   store a predetermined definition, the predetermined definition including (i) a first dialogue scene for which one or more utterance types are to be predicted, (ii) a second dialogue scene for which no utterance type is to be predicted, and (iii) an utterance content extraction method for each utterance type to be predicted for the first dialogue scene, the utterance content extraction method indicating which portion of an utterance belonging to the each utterance type is to be extracted as a focus point:
      upon receipt of input of a dialogue including a plurality of utterances, predict dialogue scenes of the plurality of utterances;
      predict, based on the predetermined definition, whether one or more utterances among the plurality of utterances whose dialogue scenes are predicted to correspond to the first dialogue scene belong to a prediction target utterance type, the prediction target utterance type being any utterance type to be predicted for the first dialogue scene; and
      extract, in accordance with an utterance content extraction method for the prediction target utterance type included in the predetermined definition, focus points of respective utterances among the one or more utterances which are predicted to belong to the prediction target utterance type.

2. The focus point extraction device according to claim 1, wherein the computer is configured to:
   determine units for utterance type prediction with respect to the one or more utterances;
   predict respective utterance types for the determined units; and
   predict whether the one or more utterances belong to the prediction target utterance type from the respective utterance types for the determined units.

3. The focus point extraction device according to claim 2, wherein the computer is further configured to:
   store dialogue history including the extracted focus points, predicted dialogue scenes of the respective utterances, and the prediction target utterance type.

4. The focus point extraction device according to claim 2, wherein the computer is further configured to:
acquire each utterance in an end-of-talk unit that is a single unit spanning from speech initiation to end-of-talk by a speaker.

5. The focus point extraction device according to claim 2, wherein the computer is further configured to:
input utterances that are predicted to be a regard utterance or a regard confirmation utterance, and topics extracted as a focus point, into a FAQ search system that searches inquiries and answers to the inquiries, and
the focus point extraction device further comprises a display configured to display the inquiries and the answers searched by the FAQ search system.

6. The focus point extraction device according to claim 1, wherein the computer is further configured to:
store dialogue history including the extracted focus points, predicted dialogue scenes of the respective utterances, and the prediction target utterance type.

7. The focus point extraction device according to claim 1, wherein the computer is further configured to:
acquire each utterance in an end-of-talk unit that is a single unit spanning from speech initiation to end-of-talk by a speaker.

8. The focus point extraction device according to claim 1, wherein the computer is further configured to:
input utterances that are predicted to be a regard utterance or a regard confirmation utterance, and topics extracted as a focus point, into a FAQ search system that searches inquiries and answers to the inquiries, and
the focus point extraction device further comprises a display configured to display the inquiries and the answers searched by the FAQ search system.

9. A non-transitory computer readable recording medium recording a program for causing a computer to function as the focus point extraction device according to claim 1.

10. The focus point extraction device according to claim 1, wherein the utterance content extraction method for the each utterance type included in the predetermined definition indicates either that a portion of the utterance belonging to the each utterance type is to be extracted or that the entirety of the utterance belonging to the each utterance type is to be extracted.

11. The focus point extraction device according to claim 1,
wherein the predetermined definition further includes (iv) an utterance content extraction method for the second dialogue scene, the utterance content extraction method indicating which portion of an utterance whose dialogue scene corresponds to the second dialogue scene is to be extracted as a focus point, and
the computer is further configured to extract, in accordance with an utterance content extraction method for the second dialogue scene included in the predetermined definition, focus points of respective utterances among the plurality of utterances whose dialogue scenes are predicted to correspond to the second dialogue scene.

12. The focus point extraction device according to claim 11, wherein the utterance content extraction method for the second dialogue scene included in the predetermined definition indicates either that the entirety of the utterance whose dialogue scene corresponds to the second dialogue scene is to be extracted or that any portion of the utterance whose dialogue scene corresponds to the second dialogue scene is not to be extracted.

13. A focus point extraction method comprising:
storing a predetermined definition, the predetermined definition including (i) a first dialogue scene for which one or more utterance types are to be predicted, (ii) a second dialogue scene for which no utterance type is to be predicted, and (iii) an utterance content extraction method for each utterance type to be predicted for the first dialogue scene, the utterance content extraction method indicating which portion of an utterance belonging to the each utterance type is to be extracted as a focus point;
upon receipt of input of a dialogue including a plurality of utterances, predicting dialogue scenes of the plurality of utterances;
predicting, based on the predetermined definition, whether one or more utterances among the plurality of utterances whose dialogue scenes are predicted to correspond to the first dialogue scene belong to a prediction target utterance type, the prediction target utterance type being any utterance type to be predicted for the first dialogue scene; and
extracting, in accordance with an utterance content extraction method for the prediction target utterance type included in the predetermined definition, focus points of respective utterances among the one or more utterances which are predicted to belong to the prediction target utterance type.

14. The focus point extraction method according to claim 13, wherein the utterance content extraction method for the each utterance type included in the predetermined definition indicates either that a portion of the utterance belonging to the each utterance type is to be extracted or that the entirety of the utterance belonging to the each utterance type is to be extracted.

15. The focus point extraction method according to claim 13,
wherein the predetermined definition further includes (iv) an utterance content extraction method for the second dialogue scene, the utterance content extraction method indicating which portion of an utterance whose dialogue scene corresponds to the second dialogue scene is to be extracted as a focus point, and
the focus point extraction method further comprises extracting, in accordance with an utterance content extraction method for the second dialogue scene included in the predetermined definition, focus points of respective utterances among the plurality of utterances whose dialogue scenes are predicted to correspond to the second dialogue scene.

16. The focus point extraction method according to claim 15, wherein the utterance content extraction method for the second dialogue scene included in the predetermined definition indicates either that the entirety of the utterance whose dialogue scene corresponds to the second dialogue scene is to be extracted or that any portion of the utterance whose dialogue scene corresponds to the second dialogue scene is not to be extracted.

* * * * *